United States Patent
Kelly et al.

(10) Patent No.: US 7,211,535 B2
(45) Date of Patent: May 1, 2007

(54) ENHANCED POLYOLEFIN CATALYST

(75) Inventors: Mark Kelly, Airdrie (CA); Shivendra Kumar Goyal, Calgary (CA); Victoria Ker, Calgary (CA); Perry Montyn de Wit, Calgary (CA); Brian Stephen Kimberley, Bouc-Bel-Air (FR); Peter Phung Ming Hoang, Calgary (CA)

(73) Assignees: Nova Chemicals Corporation (CA); Ineos Europe Limited (GB)

( * ) Notice: Subject to any disclaimer, the term of this patent is extended or adjusted under 35 U.S.C. 154(b) by 105 days.

(21) Appl. No.: 10/977,949

(22) Filed: Oct. 29, 2004

(65) Prior Publication Data

US 2006/0094838 A1  May 4, 2006

(51) Int. Cl.
*C08F 4/642* (2006.01)
*C08F 4/649* (2006.01)
*C08F 210/02* (2006.01)

(52) U.S. Cl. .............. 502/115; 502/116; 502/120; 502/125; 502/126; 502/127; 502/128; 526/124.5; 526/124.6; 526/124.7; 526/124.8

(58) Field of Classification Search ........... 502/115, 502/116, 120, 125, 126, 127, 128; 526/124.5, 526/124.6, 124.7, 124.8
See application file for complete search history.

(56) References Cited

U.S. PATENT DOCUMENTS

| 3,779,712 A | 12/1973 | Calvert et al. .......... 23/288 |
| 4,302,566 A | 11/1981 | Karol et al. .......... 526/125 |
| 4,324,691 A | 4/1982 | Hartshorn et al. ...... 252/429 |
| 4,543,399 A | 9/1985 | Jenkins, III et al. ...... 526/70 |
| 4,588,790 A | 5/1986 | Jenkins, III et al. ...... 526/70 |
| 4,719,193 A | 1/1988 | Levine et al. .......... 502/107 |
| RE33,683 E | 9/1991 | Allen et al. .......... 502/107 |
| 5,352,749 A | 10/1994 | DeChellis et al. ........ 526/68 |
| 5,436,304 A | 7/1995 | Griffin et al. .......... 526/68 |
| 5,633,419 A | 5/1997 | Spencer et al. ........ 585/522 |
| 6,046,126 A | 4/2000 | Kelly et al. .......... 502/104 |
| 6,140,264 A | 10/2000 | Kelly et al. .......... 502/104 |

FOREIGN PATENT DOCUMENTS

| CA | 2397401 A1 | 2/2003 |
| EP | 0 453 088 B1 | 7/1991 |
| EP | 0 595 574 B1 | 1/1997 |
| EP | 0 659 773 B1 | 8/1998 |
| EP | 0 744 416 B1 | 8/1998 |

OTHER PUBLICATIONS

T. Xie, K. McAuley, J.C.C. Hsu, and D.W. Bacon, Gas PhaserEthylene Polymerization: Production Processes. Polymer Properties, and Reactor Modeling, Ind. Eng. Chem. Res. 1994, 33, 449-479.
R.P. Quirk, R.E. Hoff, G.B. Klingensmith, P.J.T.Tait, B.L. Goodall, Transition Metal Catalyzed Polymerizations, Cambridge University Press, 396-416.
J.B. Peri and A.L.Hensley, Jr., The Surface Structure of Silica GEL, The Journal of Physical Chemistry, vol. 72, No. 8, 1968, pp. 1926-2933.

*Primary Examiner*—Caixia Lu
(74) *Attorney, Agent, or Firm*—Kenneth H. Johnson

(57) ABSTRACT

The present invention provides a novel process for preparing a catalyst useful in gas phase polymerization of olefins wherein the physical properties of the polymer and the productivity of the catalyst can be altered depending on the sequence of addition of the catalyst components. The catalyst consists of compounds of Ti, Mg, Al and optionally an electron donor supported on an amorphous support.

25 Claims, No Drawings

ENHANCED POLYOLEFIN CATALYST

FIELD OF THE INVENTION

The present invention relates to supported Ziegler-Natta catalysts, which are useful in olefin polymerization, and more particularly in the continuous fluidized gas phase polymerization of alpha-olefins. The present invention details a method for producing these catalysts as well as identifies a method to use them in a gas or slurry phase process to produce HDPE, medium and linear low-density polyethylene.

BACKGROUND OF THE INVENTION

Ziegler-Natta type catalysts are well known and have been used since the early 1950's. Generally, the catalyst comprises a transition metal compound, typically titanium in the 3 or 4 valence state (e.g. $TiCl_3$ or $TiCl_4$) supported on magnesium chloride.

In some cases, the catalysts are prepared in conjunction with an electron donor (ED), which is used to dissolve the $MgCl_2$ and $TiCl_3$ when they are used. This type of formulation teaches away from the current disclosure. When supported on silica, and placed in a gas phase reactor with at least one co-catalyst, typically an aluminum compound such as a trialkyl aluminum (e.g. triethylaluminum (TEAL)) or an alkyl aluminum halide (e.g. diethylaluminum chloride (DEAC)) this combination makes a good catalyst for the polymerization of polyethylene. The ED used as the solvent in the formulation tends to narrow the molecular weight distribution in the resulting polymer. As the ED is difficult to remove, polymers having a broader MWD are difficult to manufacture using this catalyst synthesis process. Also, as the ED must be capable of dissolving the $MgCl_2$, and in some cases $TiCl_3$, the choice of the electron donor is limited, a problem which is solved with the current disclosure. A good description of these types of catalysts is contained in U.S. Pat. No. 4,302,566 issued Nov. 24, 1981 to Karol et al., assigned to Union Carbide Corporation.

Alternately, the catalysts may contain magnesium chloride which may be generated from a dialkyl magnesium compound and active chloride. These types of catalysts are described in U.S. Pat. No. 4,324,691 issued Apr. 13, 1982 to Imperial Chemical Industries. This is a broad patent covering the synthesis of these types of catalysts but not disclosing the process of the present invention. This patent teaches that when an active chloride is used that the Ti species be added after the chloride which is also a restriction of the current disclosure but it is also limiting in that it teaches that when a Lewis base (i.e. ED) is used it is preferred that the Mg compound be added prior to the Lewis base a restriction which is not needed in the current disclosure.

In a similar vein, U.S. Pat. No. 5,633,419 issued May 27, 1997 to The Dow Chemical Company discloses a supported Ziegler-Natta type catalyst or catalyst precursor. However, it is a limitation of the reference that the halide is used in the form of a hydrogen halide (e.g. HCl). The reference teaches away from the subject matter of the present invention, which preferably use alkyl halides as the halide source. Additionally, the reference teaches the use of an agglomerated support such as silica, instead of a typical granular support, which is contrary to the method for preparing the catalyst of the present invention. Finally, this reference teaches away from the subject matter of the present invention as it teaches that the order of adding the components, is not critical, provided the Ti compound is added after the chlorinating agent when a dihydrocarbyl magnesium compound is used. While this criteria is of importance, a catalyst made using the order dihydrocarbyl magnesium, chlorinating agent, titanium compound, aluminum alkyl, electron donor (ED) was found to have poor polymerization productivity.

European Patent Application 0 744 416 published Nov. 27, 1996 in the name of BP Chemicals Limited (BP) teaches supported catalysts and catalyst precursors. The reference teaches that the support is reacted with either an aluminum compound or a magnesium compound followed by an alkyl halide and a tetravalent titanium compound. Electron donors can be added to the support or anytime during the synthesis. The reference teaches against the addition of a second aluminum compound. This reference also teaches that the Al:Mg molar ratio is between 0.05–0.35 which is outside the scope of the present catalysts formulations. This reference also teaches that the halogenating agent must be used in a molar ratio such that all of the Mg and Al compounds are converted to their respective halides, a limitation which is not part of the present invention. That is, in accordance with the present invention, there is an excess of reactive aluminum and magnesium groups over reactive halide so that not all of the alkyl aluminum or magnesium are reacted to their respective chlorides.

BP patent EP 0 595 574 B1 granted in Jan. 2, 1997 requires that the catalyst be prepared on a support treated with an organosilicon compound. The supports used in accordance with the present invention are treated thermally and chemically (aluminum alkyls) but not with organosilicon.

BP patent EP 0 453 088 B1 granted in Jul. 31, 1996 teaches that the catalyst be made on dehydrated silica and that the catalyst needs to be pre-polymerized to obtain a useful catalyst for the synthesis of linear low density polyethylene (LLDPE). The catalysts of the present invention do not need to be pre-polymerized to be useful for the polymerization of ethylene to LLDPE to HDPE. This reference also teaches against the addition of a second aluminum compound.

Mobil Oil Corporation U.S. Pat. No. Re. 33,683 issued Sep. 3, 1991 to Allen deals with improving the polymers physical properties using trimethyl aluminum (TMA) instead of triethyl aluminum (TEAL) as a co-catalyst. This patent teaches away from the aspects of the current invention, which can produce products having good physical properties using TEAL as a co-catalyst.

NOVA Chemicals Ltd. U.S. Pat. No. 6,140,264 issued Oct. 31, 2000 and U.S. Pat. No. 6,046,126 issued Apr. 4, 2000 to Kelly et al, both deal with making a $TiCl_4$ supported catalyst on magnesium chloride (precipitated from a dialkyl magnesium compound and an organic halide) which is on a thermally and chemically treated silica. This reference teaches against the addition of a second aluminum compound and limits the electron donor to relatively low levels both restrictions which have been removed from the present invention. This patent also does not identify that the order of chemical addition is important to catalyst productivity and polymer physical properties.

The present invention seeks to provide a process for the polymerization of olefin polymers, preferably polymers of ethylene in which the physical properties of the polymer are improved while maintaining the catalysts productivity. Prior to this discovery, one way known to improve the polymers physical properties through catalyst changes was to reduce the titanium on the catalyst by adding large amounts of aluminum alkyls, which in turn produced a catalyst with undesirable catalyst productivity. The inventors have unexpectedly found that both the catalyst productivity and the polymers physical properties can be altered by varying the order of addition of the catalyst components. These catalysts are novel as the physical properties of the resin that they produce can be altered by changing the order of addition of components for the catalyst preparation. That is to say, the polymers physical properties and catalyst productivity will change even though the concentrations of the catalyst components are kept constant.

SUMMARY OF THE INVENTION

The present invention provides a continuous process for preparing an alpha-olefin polymerization catalyst composition having a productivity of greater than 1,500 g of polymer per gram of catalyst under standard gas phase operations used to manufacture an ethylene hexene copolymer resin having a melt index (MI) of 1 and a density of 0.918 g/cc comprising contacting at a temperature from 0° C. to 100° C. a support which has been heat treated to remove adsorbed water and having a residual surface hydroxyl content from 0.1 to 5 mmol/g of support, which support has been subsequently treated with an aluminum compound reactive with the surface hydroxyl groups, where the aluminum on the support is from 0.5 to 2.5 weight %, in an inert hydrocarbyl solvent or diluent, with or without isolation of the treated support from the hydrocarbyl solvent or diluent, with: a transition metal compound; a magnesium halide prepared by reacting in situ a magnesium compound of the formula $(R^5)_e Mg\, X_{2-e}$ wherein each $R^5$ is independently a $C_{1-8}$ alkyl radical and e is 1 or 2 and X is a chlorine or bromine atom with a reactive organic halide selected from the group consisting of $CCl_4$, $C_{1-6}$ alkyl halides preferably $C_{3-6}$ secondary and tertiary alkyl halides most preferably alkyl chlorides or a mixture thereof; a second aluminum alkyl compound; and optionally an electron donor and separating the resulting catalyst from the inert hydrocarbyl solvent or diluent provided that the order of reagent addition to the support meets the following conditions:

(i) the transition metal compound cannot be added first;

(ii) when the Mg compound is added first, the transition metal compound cannot be added second;

(iii) when the second aluminum alkyl is added first, the transition metal compound cannot be added second;

(iv) when the Mg compound and the second aluminum alkyl compound are added first and second, in any order, the transition metal compound cannot be added third;

(v) the transitional metal compound must be added after the reactive organic halide selected from the group consisting of $CCl_4$ and $C_{1-6}$ alkyl halides preferably $C_{3-6}$ secondary and tertiary alkyl halides, preferably alkyl chlorides, and mixtures thereof;

(vi) the transition metal compound must be added after the magnesium compound;

(vii) the electron donor, if present, cannot be added last;

(viii) the reactive organic halide selected from the group consisting of $CCl_4$ and $Cl_{1-6}$ alkyl halides preferably of $C_{3-6}$ secondary and tertiary alkyl halides preferably alkyl chlorides or mixture thereof cannot be added last;

(ix) if the reactive organic halide selected from the group consisting of $CCl_4$ and $Cl_{1-6}$ alkyl halides preferably $C_{3-6}$ secondary and tertiary alkyl halides, preferably chlorides or a mixture thereof is first, the second aluminum alkyl compound cannot be second;

(x) if the second aluminum alkyl compound is first the reactive organic halide selected from the group consisting of $CCl_4$ and $C_{1-6}$ alkyl halides preferably $C_{3-6}$ secondary and tertiary alkyl halides, preferably chlorides or a mixture thereof cannot be second; and (xi) when the transition metal is last, the second aluminum alkyl and Mg compounds cannot be third or fourth, in any order.

The present invention also provides a gas phase process for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, conducted at a temperature from 50° C. to 125° C., preferably less than 115° C. in the presence of a catalyst and a co-catalyst as described above.

The present invention further provides a polymer comprising from 0 to 20 weight % of one or more $C_{3-8}$ alpha-olefins, from 80 to 100 wt % of ethylene having a molecular weight (Mw) greater than 50,000 and a polydispersity $(M_w/M_n)$ from 2.5 to 10, for a single reactor typically from 2.5 to 5 preferably from 3 to 4, prepared according to the above process.

The present invention provides a process for controlling the catalyst productivity and polymers physical properties by altering the way in which the catalyst is made. The catalyst productivity must be above 1,500 g of polymer per gram of catalyst under standard gas phase operations to manufacture an ethylene hexene copolymer resin having a melt index (MI) of 1 and a density of 0.918 g/cc. For the purposes of this patent the catalyst may be synthesized in the following manner. The support can consist of an oxide support such as aluminum oxide or silicon oxide with the preferred source being silica.

The catalyst can be synthesized in any number of ways provided that the following criteria are met:

(i) the transition metal compound cannot be added first;

(ii) when the Mg of the formula $(R^5)_e Mg\, X_{2-e}$ wherein each $R^5$ is independently a $C_{1-8}$ alkyl radical and e is 1 or 2 and X is a chlorine or bromine atom is added first, the transition metal compound cannot be added second;

(iii) when the second aluminum alkyl is added first, the transition metal compound cannot be added second;

(iv) when the above noted Mg compound and the second aluminum alkyl compound are added first and second, in any order, the transition metal compound cannot be added third;

(v) the transitional metal compound must be added after the reactive organic halide selected from the group consisting of $CCl_4$ and $C_{1-6}$ alkyl halides preferably $C_{3-6}$ secondary and tertiary alkyl halides, preferably chlorides or a mixture thereof;

(vi) the transition metal compound must be added after the above noted magnesium compound;

(vii) the electron donor, if present, cannot be added last;

(viii) the reactive organic halide selected from the group consisting of $CCl_4$ and $C_{1-6}$ alkyl halides preferably $C_{3-6}$ secondary and tertiary alkyl halides, preferably chlorides or a mixture thereof cannot be added last;

(ix) if the reactive organic halide selected from the group consisting of $CCl_4$ and $C_{1-6}$ alkyl halides preferably $C_{3-6}$ secondary and tertiary alkyl halides, preferably chlorides or a mixture thereof is first the second aluminum alkyl compound cannot be second;

(x) if the second aluminum alkyl compound is first the reactive organic halide selected from the group consisting of $CCl_4$ and $C_{1-6}$ alkyl halides preferably $C_{3-6}$ secondary and tertiary alkyl halides, preferably chlorides or a mixture thereof cannot be second;

(xi) when the transition metal is last, the second aluminum alkyl and the above noted Mg compounds cannot be third or fourth, in any order.

The catalyst productivity must be greater than 1,500 g of polymer per gram of catalyst under standard gas phase commercial plant operations typically used in a gas phase process to manufacture a 1 MI ethylene hexene copolymer having a density of 0.918 g/cc.

The present invention provides a continuous process, preferably gas phase for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, conducted at a temperature from 50° C. to 125° C. preferably less than 115° C in the presence of a catalyst as described above. When the molecular weight distribution of the finished products are required to be broader, then the electron donor should not be used.

The present invention further provides a slurry phase process for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, in an inert diluent conducted at a temperature from 50° C. to 125° C. in the presence of a catalyst as described above.

The present invention further provides a polymer comprising from 0 to 20 weight % of one or more $C_{3-8}$ alpha-olefins, from 80 to 100 weight % of ethylene having a molecular weight (Mw) greater than 50,000 and a polydispersity ($M_w/M_n$) from 2.5 to 5 prepared according to the above process.

In a particularly preferred embodiment the present invention provides a process for the gas phase polymerization of ethylene and one or more $C_{3-8}$ copolymerizable alpha olefin monomers in the presence of a supported Ziegler-Natta catalyst comprising one or more aluminum compounds of the formula $R^1{}_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom, a titanium compound of the formula $Ti(OR^2)_c X_d$ wherein $R^2$ is selected from the group consisting of a $C_{1-4}$ alkyl radical, a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound of the formula $(R^5)_e Mg X_{2-e}$ wherein each $R^5$ is independently selected from the group consisting of $C_{1-8}$ alkyl radicals, X is a chlorine atom and e is 1 or 2, a reactive organic halide selected from the group consisting of $CCl_{1-4}$, $C_{3-6}$ secondary and tertiary alkyl halides, preferably chlorides, or a mixture thereof and optionally an electron donor.

In accordance with some preferred aspects of the present invention there is provided component loading ratios of: a molar ratio of total aluminum to Ti from 2:1 to 15:1, preferably from 4:1 to 10:1; a molar ratio Al from the second alkyl aluminum ($Al^2$) to Ti from 1:1 to 8:1; a molar ratio of Mg:Ti from 1:1 to 20:1, preferably from 2:1 to 12:1, most preferred from 3:1 to 10:1; a molar ratio of active halide from the reactive organic halide to Mg from 1:1 to 6:1, preferably from 1.5:1 to 5:1; and a molar ratio of electron donor to Ti from 0:1 to 18:1, preferably from 0.5:1 to 15:1; said catalyst being co-catalyzed with a co-catalyst selected from the group consisting of tri $C_{1-8}$ alkyl aluminums, alkyl aluminum chlorides (e.g. di $C_{1-8}$ alkyl aluminum chloride), and mixtures thereof, preferably in an amount to provide from 10 to 50 ppm of aluminum from the co-catalyst based on the polymer production rate.

In accordance with a further aspect of the present invention there is provided a method for controlling the gas phase polymerization with a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, in the presence of the above noted supported Ziegler-Natta catalyst co-catalyzed with a co-catalyst selected from the group consisting of tri $C_{1-6}$ alkyl aluminum, alkyl aluminum halides and mixtures thereof, by controlling the amount of co-catalyst in the range from 10 to 50 ppm aluminum based on the polymer production rate in the reactor and typically an Al:Ti molar ratio 25:1 to 80:1.

DETAILED DESCRIPTION

In this specification the term MI means melt index of an ethylene hexene copolymer having a density of 0.918 g/cc produced using a gas phase polymerization. The MI is determined according to ASTM D 1238-04 at condition 190/2.16 (at 190° C. and under a weight of 2.16 Kg.).

One of ordinary skill in the art should know how to produce an ethylene hexene copolymer having a density of 0.918 g/cc and a 1 melt index to test the catalyst of the present invention.

In this specification density (g/cc or $kg/m^3$) means the density determined according to ASTM D 792-00.

In this specification and claims the terms catalyst and catalyst precursor are used interchangeably as some may consider the catalyst the species activated with the co-catalyst. The term catalyst and catalyst precursor are meant to mean the supported composition before further reaction with the activator, typically a tri $C_{1-8}$, preferably $C_{2-6}$, most preferably $C_{2-4}$ alkly aluminum or $C_{1-8}$, preferably $C_{2-6}$ most preferably $C_{2-4}$ alkyl aluminum halide in the reactor. The catalyst or catalyst precursor may be pre polymerized prior to introduction into the reactor. Typically the pre polymer contains from about 5 to 20, typically 5 to 15 weight % of supported catalyst.

The polymerization process may be gas or slurry phase.

The gas phase, and particularly the fluidized bed gas phase polymerization of ethylene polymers has been known for some time. A broad general description of these types of processes is set out in the paper "Gas Phase Ethylene Polymerization: Production Processes, Polymer Properties, and Reactor Modeling", by Tuyu Xie, Kim B. McAuley, James C. C. Hsu, and David W. Bacon, Ind. Eng. Chem. Res. 1994, 33, 449–479.

Generally, a monomer feed comprising at least ethylene and optionally one or more $C_{3-8}$ alpha-olefins is fed to a gas phase fluidized bed or stirred bed reactor. The monomer mixture optionally together with hydrogen and/or an inert gas are fed to the fluidized bed. In a fluidized bed reactor, the velocity of the gas is sufficient to suspend the bed in the fluid flow of monomer and other components. In a stirred bed reactor mechanical agitation serves to help suspend the bed. Generally a fluid bed reactor is vertical and a stirred bed reactor is horizontal. Concurrently with the monomers a co-catalyst and a supported catalyst are fed to the bed. The monomer passing over the catalyst polymerizes on the catalyst and in the pores of the catalyst causing the particle to increase in size and to break. The resulting polymer particle continues to grow as it resides in the reactor. In a stirred tank reactor the bed is stirred to a discharge section and leaves the reactor. In a fluidized bed the reactor typically has a narrower section to keep the fluid (gas) velocity sufficiently high to fluidize the bed. There is an expanded zone at the top of the reactor to reduce the speed of the gas passing through the reactor so the polymer/catalyst particles fall back into the bed. The discharge is from the bed zone in the reactor.

In both the fluidized bed and stirred bed the polymer particles removed from the reactor are degassed to remove any volatile material and the resulting polymer (with entrained catalyst) may then be further treated (e.g. stabilizers added and pelletized if necessary).

Ziegler-Natta catalysts are used in the gas phase polymerization of ethylene. Typically, the catalysts comprise a support, a magnesium compound (optionally in the presence of a halide donor to precipitate magnesium halide), a titanium compound and an aluminum compound, in the presence of an electron donor. The aluminum compound is added at different stages. It is added to the support to chemically treat it (i.e. $Al^1$) and it is added at some point during the manufacture of the catalyst (i.e. $Al^2$).

The support for the catalysts useful in the present invention typically comprises an inorganic substrate usually of alumina or silica having a pendant reactive moiety. The reactive moiety may be a siloxy radical or more typically is a hydroxyl radical. The preferred support is silica. The support should have an average particle size from about 0.1 to 150 microns, typically from 10 to 150 microns, preferably from about 20 to 100 microns. The support should have a large surface area typically greater than about 100 m$^2$/g, preferably greater than about 250 m$^2$/g, most preferably from 300 m$^2$/g to 1,000 m$^2$/g. The support may be porous and may have a pore volume from about 0.3 to 5.0 ml/g, typically from 0.5 to 3.0 ml/g. Supports which are specifically designed to be an agglomeration of sub-particles while useful, are not required.

The support can be heat treated and/or chemically treated to reduce the level of surface hydroxyl (OH) groups in a similar fashion to that described by A. Noshay and F. J. Karol in *Transition Metal Catalyzed Polymerizations*, Ed. R. Quirk, 1989, pg. 396. After treatment the support may be put into a mixing vessel and slurried with an inert solvent or diluent preferably a hydrocarbon and contacted with or without isolation or separation from the solvent or diluent of the catalyst components.

It is important that the support be dried prior to the initial reaction with an aluminum compound. Generally, the support may be heated at a temperature of at least 200° C. for up to 24 hours, typically at a temperature from 500° C. to 800° C. for about 2 to 20, preferably 4 to 10 hours. The resulting support will be free of adsorbed water and should have a surface hydroxyl content from about 0.1 to 5 mmol/g of support, preferably from 0.5 to 3 mmol/g.

A silica suitable for use in the present invention has a high surface area and is amorphous. For example, commercially available silicas are marketed under the trademark of Sylopol® 958 and 955 by Davison Catalysts a Division of W. R. Grace and Company and ES-70W by Ineos Silica.

The amount of the hydroxyl groups in silica may be determined according to the method disclosed by J. B. Peri and A. L. Hensley, Jr., in *J. Phys. Chem.*, 72 (8), 2926, 1968, the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g. triethyl aluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 396, 1989. For example the support may be treated with an aluminum compound of the formula $R^1{}_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom. The amount of aluminum compound is such that the amount of aluminum on the support prior to adding the remaining catalyst components will be from about 0.5 to 2.5 weight %, preferably from 1.0 to 2.0 weight % based on the weight of the support. The remaining aluminum content is added as a subsequent or second component of the catalyst (e.g. $Al^2$). The first and second aluminum compounds may be the same or different. If the first and second aluminum compounds are the same the electron donor is preferably present.

Typically the Ziegler-Natta catalyst useful in accordance with the present invention will comprise an aluminum compound of the formula $R^1{}_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom, a titanium compound of the formula $Ti(OR^2)_c X_d$ wherein $R^2$ is selected from the group consisting of a $C_{1-4}$ alkyl radical, a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound of the formula $(R^5)_e Mg X_{2-e}$ wherein each $R^5$ is independently a $C_{1-8}$ alkyl radical and e is 1 or 2; a reactive organic halide selected from the group consisting of $CCl_4$ and $C_{1-6}$ alkyl halides preferably $C_{3-6}$ secondary and tertiary alkyl halides, preferably chlorides or a mixture thereof and optionally an electron donor, a molar ratio of total Al to Ti (e.g. the first and second aluminum additions $Al^1$ and $Al^2$-typically from 0 to 70 weight % of the aluminum compound is used to treat the support and the remaining aluminum is added at some time during the rest of the catalyst synthesis) from 2:1 to 15:1 a molar ratio of Al from the second aluminum ($Al^2$) addition to Ti from 1:1 to 8:1; a molar ratio of Mg:Ti from 1:1 to 20:1, preferably 2:1 to 12:1; a molar ratio of active halide (this excludes the halide from the Al and Ti compounds if present) from the $CCl_4$ or $C_{1-6}$ preferably $C_{3-6}$ alkyl halide or mixtures thereof to Mg from 1:1 to 6:1, preferably 1.5:1 to 5:1; and a molar ratio of electron donor to Ti from 0:1 to 18:1, preferably from 0.5:1 to 15:1.

Typically the catalyst components are reacted in an organic medium such as an inert $C_{5-10}$ hydrocarbon that may be unsubstituted or is substituted by a $C_{1-4}$ alkyl radical. Some solvents include pentane, isopentane, hexane, isohexane, heptane, octane, cyclohexane, methyl cyclohexane, hydrogenated naphtha and ISOPAR®E (a solvent available from Exxon Chemical Company) and mixtures thereof.

Typically the aluminum compounds useful in the formation of the catalyst or catalyst precursor in accordance with the present invention have the formula $R^1{}_b Al(OR^1)_a X_{3-(a+b)}$ wherein a is an integer from 0 to 3, preferably 0 or 1, b is an integer from 0 to 3 preferably 2 or 3 most preferably 3, and the sum of a+b is from 0 to 3 preferably 3, $R^1$ is the same or different $C_{1-10}$, preferably a $C_{1-8}$ alkyl radical and X is a halogen atom preferably a chlorine atom. Suitable aluminum compounds include, trimethyl aluminum (TMA), triethyl aluminum (TEAL), diethyl aluminum ethoxide, diisobutyl aluminum ethoxide, isoprenyl aluminum, tri-isobutyl aluminum (TiBAL), diethyl aluminum chloride (DEAC), tri-n-hexyl aluminum (TnHAl), tri-n-octyl aluminum (TnOAl), and mixtures thereof. The aluminum compounds containing a halide may be an aluminum sesqui-halide. Preferably, in the aluminum compound a is 0, b is 3 and $R^1$ is a $C_{1-8}$ alkyl radical.

The magnesium compound may be a compound of the formula $(R^5)_e MgX_{2-e}$ wherein each $R^5$ is independently a $C_{1-8}$ alkyl radical and e is 1 or 2. Some commercially available magnesium compounds include magnesium chloride, butyl octyl magnesium, dibutyl magnesium and butyl ethyl magnesium. If the magnesium compound is soluble in the organic solvent it may be used in conjunction with a $C_{3-6}$ halogenating agent or reactive organic halide to form magnesium halide (i.e. $MgX_2$ where X is a halogen preferably chlorine or bromine, most preferably chlorine), which precipitates from the solution (potentially forming a substrate for the Ti compound).

Some halogenating agents (e.g. reactive organic halides) include $CCl_4$ or one or more secondary or tertiary halides, preferably chlorides, of the formula $R^6Cl$ wherein $R^6$ is selected from the group consisting of $C_{1-6}$ alkyl radicals preferably secondary and tertiary $C_{3-6}$ alkyl radicals. Suitable chlorides include sec-butyl chloride, t-butyl chloride and sec-propyl chloride. The reactive halide is added to the catalyst in a quantity such that the molar ratio of active halide (e.g. chloride from the reactive organic halide):Mg should be from 1:1 to 6:1, preferably from 1.5:1 to 5:1, more preferably from 1.5:1 to 3:1 and most preferred from 1.9:1 to 3:1.

The titanium compound in the catalyst has the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom preferably chlorine, c is 0 or an integer up to 4 and d is 0 or an integer up to 4 and the sum of c+d is the valence of the Ti atom. The titanium compound may be selected from the group consisting of $TiCl_3$, $TiCl_4$, $Ti(OC_4H_9)_4$, $Ti(OC_3H_7)_4$, and $Ti(OC_4H_9)Cl_3$. Most preferably the titanium compound is selected from the group consisting of $Ti(OC_4H_9)_4$ and $TiCl_4$ and mixtures thereof. Generally, the titanium in the catalyst or catalyst precursor is present in an amount from 0.20 to 3, preferably from 0.20 to 1.5, most preferably from 0.25 to 1.0 weight % based on the final weight of the catalyst (including the support).

As noted above, an electron donor may be and in fact is preferably used in the catalysts or catalysts precursor used in accordance with the present invention. The electron donor may be selected from the group consisting of $C_{3-18}$ linear or cyclic aliphatic or aromatic ethers, ketones, esters, aldehydes, amides, nitrites, amines, phosphines or siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor when present may be used in a molar ratio to the titanium from 0.5:1 to 18:1 preferably in a molar ratio to Ti from 1:1 to 15:1, most preferably from 2:1 to 12:1.

In the catalyst or catalyst precursor the molar ratio of Mg:Ti may be from 1:1 to 20:1, preferably from 2:1 to 12:1, most preferably from 3:1 to 10:1. The molar ratio of second aluminum ($A^2$) to titanium in the catalyst may be from 1:1 to 8:1, preferably from 1.5:1 to 7:1, most preferably from 2:1 to 6:1. Generally, from 0 to not more than about 70 weight %, preferably from 10 to 60 weight %, of the aluminum (compound in the catalyst) may be used to treat the support (e.g. $Al^1$). The molar ratio of active halide (from the reactive organic halide) to Mg may be from preferably 1.5:1 to 5:1, more preferably from 1.5:1 to 3:1, most preferably from 1.9:1 to 3:1. The molar ratio of electron donor, if present, to Ti may be from 0.5:1 to 18:1, preferably from 1:1 to 15:1. most preferably from 2:1 to 12:1. The molar ratio of total Al:Mg in the catalyst or catalyst precursor may be from 0.35:1 to 3:1, preferably from 0.4:1 to 2:1.

In a preferred embodiment there is provided a process conducted in a hydrocarbon solvent at a temperature from 0° C. to 100° C. for preparing a catalyst in which the order of chemical addition is important, for the gas phase polymerization of alpha-olefins comprising:

(a) contacting a dehydrated silica support containing from 0.5 to 2.5 weight % aluminum having the formula $R^1{}_b Al (OR^1)_a X_{3-(a+b)}$ wherein a is an integer from 0 to 3 preferably 0 or 1, b is an integer from 0 to 3, preferably 2 or 3, most preferably 3, and the sum of a+b is from 0 to 3, preferably 3, $R^1$ is the same or different $C_{1-10}$ alkyl radical, X is selected from the group consisting of Cl and Br preferably Cl; with (b) a magnesium compound of the formula $Mg(R^5)_2$ wherein each $R^5$ is independently selected from the group consisting of $C_{1-8}$ alkyl radicals and may contain an aluminum alkyl as a thinning agent, to provide from 0.25 to 8.0 weight % of Mg based on the weight of the silica, contacting the resulting product; with (c) a reactive organic halide selected from the group consisting of $CCl_4$ and $C_{3-6}$ secondary and tertiary alkyl chlorides or a mixture thereof to provide a Cl:Mg molar ratio from 1.5:1 to 3:1 in the resulting product; and contacting the resulting product; with (d) an aluminum compound of the formula $R^1{}_b Al (OR^1)_a X_{3-(a+b)}$ wherein a is an integer from 0 to 3, preferably 0 or 1, b is an integer from 0 to 3, preferably 2 or 3, most preferably 3, and the sum of a+b is from 0 to 3, preferably 3, $R^1$ is the same or different $C_{1-10}$ alkyl radical, X is selected from the group consisting of a chlorine or bromine atom, preferably chlorine, to provide a molar ratio of Al (from the second aluminum addition (e.g. $Al^2$):Ti from 1:1 to 8:1;

(e) optionally an electron donor in an ED:Ti ratio from 0:1 to 18:1. The electron donor may be selected from the group consisting of $C_{3-18}$ linear or cyclic aliphatic or aromatic ethers, ketones, ester, aldehydes, amides, esters, nitriles, amines, phosphines, or siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor may be used in a molar ratio to the titanium from 0:1 to 18:1, preferably from 0.5:1 to 15:1, more preferably from 1:1 to 15:1 and most preferably from 2:1 to 12:1;

(f) a titanium compound of the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom, preferably a chlorine atom, c is 0 or an integer up to 4 and d is 0 or an integer up to 4 and the sum of c+d is the valence of the Ti atom, preferably 3 or 4, to provide from 0.20 to 3 weight % of Ti based on the final catalyst.

The order of carrying out b through f is dependent on the criteria listed above being met. There are 120 different ways in which to produce a catalyst using the above five compounds (e.g for any given 5 components assuming the treated silica is always added first, they may be mixed in 120 different ways). However, by employing the above restrictions, only 24 are allowed. Without being tied to any theories, even limiting the catalyst synthesis to the above criteria will likely produce a number of catalysts that show low productivity and hence have limited commercial applicability. Thus, productivity is a limitation to limit the number of catalyst formulations that proves to be useful. The productivity criteria is that the catalyst has a productivity of greater than 1,500 grams of polymer per gram of catalyst (g/g) under standard commercial plant operations such as for an ethylene hexene copolymer having an MI of 1 and a density of 0.918. The conditions of operation of a plant to produce a resin having a melt index (MI) of 1 as determined by ASTM D 1238-04 and a density of 0.918 g/cc as determined by ASTM D 792-00 are well known to those skilled in the art. However, if the productivity of a catalyst is below 1,500 g of polymer/g of catalyst due to the poor selection of components and or loading levels this does not mean that a particular synthesis order is poor. It may simply mean that another formulation is required to obtain a usable catalyst when synthesizing using a particular order of addition. For example, if the halide (preferably Cl):Mg molar ratio is 1.5 in the above synthesis some of the possible 24 combinations may produce a catalyst with low productivity. However, if the halide (preferably Cl):Mg molar ratio is 3, then it is highly likely that all of the above 24 combinations would produce an active catalyst. Following the above criterion, one of ordinary skill in the art, may, by routine non-inventive experimentation, determine appropriate components, loadings and sequence following the teachings of the present invention.

One needs to consider that the ideal catalyst of choice may be selected by the user to provide the best product for the lowest cost. However, in general there are three distinct user groups: polyethylene manufacturers, polyethylene converters and polyethylene consumers, and their criteria for success may not always be aligned. For example it is likely that everyone wants the best product for the least cost. However, the manufacturer may want to maximize plant throughput by increasing the flowability of the granular resin through the plant or by increasing the MWD to increase throughput through an extruder. Manufacturers may also choose to increase bulk density to increase the speed at which product can be discharged from the reactor. Alternately, manufacturers may want to reduce the need for a costly co-catalyst such as trimethyl aluminum and instead use triethyl aluminum. To limit capital costs, losses to flare or reduce the amount of co-monomer being recycled, manufacturers may also want a catalyst that requires low levels of co-monomer to ethylene in the reactor. Then again, manufacturers may want a catalyst with high productivity to reduce the amount they spend on catalyst. Converters will want to maximize throughput in their extruders and want broad MWD products without the loss of polymer physical properties. Hexane extractables may be important to a converter such that the products they make pass specific FDA regulations. Consumers on the other hand will want tough products in applications such as garbage bags and therefore may require high dart impact strength and machine direction (MD) tear strength. On the other hand, others may prefer sticky resin for stretch wrapping products. In summary, the ideal catalyst is dependent on the end user group and thus there can be many preferred catalysts. From a manufacturers perspective it would be best to have one catalyst fit all. However, from a users perspective one generally prefers to have specific areas addressed. For any given product, while one manufacturer wants a high productivity catalyst, another may want a catalyst that delivers a product with low hexane extractables, or high bulk density while a third may want a low $C_6/C_2$ gas phase ratio. These requests can now be fulfilled. In the past, numerous attempts by NOVA Chemicals to adjust the performance of older technology failed to alter the performance of the catalyst. While this is good from a producer's point of view in that the commercial plant products have a high degree of consistency, it is not good if one or more properties need to be improved upon.

One general synthetic procedure which follows the above criteria could be written as follows: treated silica is added to a reaction vessel and treated concurrently with the following, with or without isolation, butyl ethyl magnesium, t-butyl chloride, tetrahydrofuran, titanium tetrachloride, and trioctyl aluminum prior to drying to produce a free flowing powder. This is one of the acceptable orders as defined above. The catalyst or catalyst precursor is fed to the reactor, generally above a distributor plate into the bed of growing polymer particles using a metering device. One such device is disclosed at Col. 8 lines 15–20 of U.S. Pat. No. 4,543,399 issued Sep. 24, 1985 to Jenkins III et al. assigned to Union Carbide Corporation (which references U.S. Pat. No. 3,779,712 issued Dec. 18, 1973 to Calvert et al., assigned to Union Carbide Corporation). The co-catalyst, typically a tri $C_{1-8}$ alkyl aluminum (in neat form or in a solution diluted with a hydrocarbon solvent) is also fed to the bed of growing polymer particles using a liquid metering device. Such devices are known in the art.

The co-catalyst may be selected from the group consisting of tri $C_{1-8}$ alkyl or alkenyl; aluminums, alkyl aluminum chlorides (e.g. di $C_{1-8}$ alkyl aluminum chloride), and mixtures thereof. This includes trimethyl aluminum, triethyl aluminum, tripropyl aluminum, tributyl aluminum, triisobutyl aluminum, diethyl aluminum ethoxide, diisobutyl aluminum ethoxide, isoprenylaluminum, tri-n-hexyl aluminum, tri-octyl aluminum, diethyl aluminum chloride, dibutyl aluminum chloride, and mixtures thereof. A preferred co-catalyst is triethyl aluminum. While the aluminum halides might be useful in accordance with the present invention they increase the amount of halide in the polymer resulting in increased consumption of additives to neutralize and stabilize the resulting polymer and are therefore not preferred.

The co-catalyst may be fed to the reactor to provide from 10 to 100, preferably, 10 to 50, more preferably 16 to 50 most preferably from 17 to 30, desirably from 20 to 26 ppm of aluminum (Al ppm) based on the polymer production rate. Such a process is more fully described in Canadian Patent Application 2,397,401 laid open Feb. 20, 2003 (the text of which is hereby incorporated by reference). In some instances by using the Al ppm control technique the resin stickiness may be reduced and productivity increased up to about 20%. Also the variability in resin properties and process control parameters including melt index, density, hexane extractables, hydrogen and co-monomer response may be reduced by up to 50%.

In the reactor the gas phase typically comprises the monomers, a balance gas such as nitrogen, a molecular weight control agent such as hydrogen, and depending on the process possibly a condensable liquid (i.e. condensing mode such as disclosed in U.S. Pat. No. 4,543,399 issued Sep. 24, 1985 to Jenkins III et al.; U.S. Pat. No. 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc. and U.S. Pat. 5,436,304 issued Jul. 25, 1995 to Griffen et al., assigned to Exxon Chemical Patents, Inc.).

The reactor mixture comprises from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$. Copolymerizable olefins include butene (1-butene), 4-methyl-1-pentene, pentene, hexene (1-hexene) and octene (1-octene), although it may be difficult to keep significant amounts of octene in the gas phase. The polymer may have a density from 0.905 to 0.965 g/cc, typically from about 0.910 to about 0.960 g/cc.

Triethyl aluminum may be used as a co-catalyst in amounts from 10 to 100 ppm Al based on the polymer production rate, preferably from 10 to 50, more preferably from 16 to 50 Al ppm most preferably from 17 to 30 Al ppm, desirably from 20 to 26 Al ppm.

Fluidized bed gas phase reactors to make polyethylene are generally operated at temperatures from about 50° C. up to about 125° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Typically the resulting polymer will comprise from 85 to 100 weight % of ethylene and from 0 to 15 weight % of one or more $C_{3-8}$ alpha-olefins. The polymer should have a molecular weight (weight average, Mw) greater than 50,000. The polymers prepared according to the present invention will have a polydispersity (Mw/Mn) from 2.5 to 5, preferably from 3 to 4.

The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine light stabilizers (HALS); process aids such as fatty acids or their derivatives and fluoropolymers optionally in conjunction with low molecular weight esters of polyethylene glycol.

The present invention will now be illustrated by the following non-limiting examples.

In the examples the following abbreviations are used:
BEM is Butyl ethyl magnesium;
THF is tetrahydrofuran;
TnOAL is tri (normal) octyl aluminum; $TiCl_4$ is titanium tetrachloride;
t-BuCl is tertiary butyl chloride;
THAL is trihexyl aluminum; and
TEAL is triethyl aluminum.

EXAMPLE 1

Silica (30 g) which had been dehydrated substantially as described in U.S. Pat. No. 6,140,264 was added to a 500 mL three-neck flask in a glove box. To the flask was added 220 mL of pentane. After the pentane was added the slurry was stirred using a magnetic stir bar. To the slurry was added triethyl aluminum (25 wt %, 7.35 g, 0.016 mole) over approximately 5 minutes. After stirring for 30 minutes, butyl ethyl magnesium (20 wt % containing 0.33 wt % Al as TEAL, 21 g, 0.038 mole) was added over approximately 15 minutes. After stirring for 2 hours, the slurry was cooled to maintain a temperature below 20° C. while t-BuCl (7.1 g, 0.077 mole) was added as a dilute (~25 wt %) solution over about 15 minutes. After stirring for 2 hours or letting the slurry sit overnight, tetrahydrofuran (3.07 g, 0.43 mole) was added as a dilute (25 wt %) solution over about 10 minutes. After 1 hour of stirring titanium tetrachloride (0.9 g, 0.0047 mole) was added as a dilute solution (~20%) over approximately 5 minutes. After 2 hours of stirring, trioctylaluminum (25.8 wt %, 37.1 g, 0.026 mole) was added over approximately 10 minutes. After stirring for 45 minutes the slurry is put under vacuum and dried at 50° C. to produce approximately 52 g of tan powder having a titanium content of about 0.44%.

EXAMPLES 2–14

To study the effect of alternating the addition order using the general guidelines as described in this patent the formulation used in Example 1 was used to manufacture 13 other catalysts in which the only difference was in the order in which the components were added. These catalyst and the order in which they were synthesized are shown in Table 1.

EXAMPLE 15–18

To study the effect of alternating the addition order but not following the general guidelines as described in this patent, formulations 15 to 18 were manufactured. These catalysts and the order in which they were synthesized are shown in Table 2. No information on resin characterization is given as the catalyst were essentially inactive.

Bench Scale Polymerization Method for Catalysts 1 to 18

In a 2 L stirred bed catalytic reactor at 85° C. containing hydrogen (25 psi), nitrogen (60 psi), ethylene (120 psi), and a hexene:$C_2H_4$ molar ratio of 0.065 the above catalysts (60 mg) were added to the reactor. TEAL was used as a co-catalyst and an Al:Ti ratio of 60:1 was used for all experiments. The polymerization was continued for 1 hour at which time the feed gases were stopped and the reactor was vented. Under these conditions a LLDPE was formed whose properties are shown in Table 1.

TABLE 1

Catalyst Examples Synthesized Using Alternate Orders of Addition

| Catalyst Number | Order of Components | | | | | Average Yield (g) | MI (g/10 min) | Density (g/cc) |
|---|---|---|---|---|---|---|---|---|
| 1 | BEM | t-BuCl | THF | TiCl4 | TnOAl | 14.8 | 0.79 | 0.928 |
| 2 | BEM | TnOAl | THF | t-BuCl | TiCl4 | 9.1 | 0.63 | 0.931 |
| 3 | BEM | t-BuCl | TnOAl | THF | TiCl4 | 22.5 | 1.07 | 0.927 |
| 4 | THF | TnOAl | t-BuCl | BEM | TiCl4 | 16.1 | 0.89 | 0.927 |
| 5 | BEM | t-BuCl | THF | TnOAl | TiCl4 | 7.7 | 0.74 | 0.930 |

TABLE 1-continued

Catalyst Examples Synthesized Using Alternate Orders of Addition

| Catalyst Number | Order of Components | | | | | Average Yield (g) | MI (g/10 min) | Density (g/cc) |
|---|---|---|---|---|---|---|---|---|
| 6 | BEM | THF | TnOAl | t-BuCl | TiCl4 | 12.0 | 0.69 | 0.929 |
| 7 | BEM | TnOAl | t-BuCl | THF | TiCl4 | 37.9 | 0.78 | 0.922 |
| 8 | BEM | THF | t-BuCl | TiCl4 | TnOAl | 11.7 | 0.65 | 0.930 |
| 9 | THF | t-BuCl | BEM | TiCl4 | TnOAl | 17.5 | 0.89 | 0.927 |
| 10 | THF | BEM | t-BuCl | TiCl4 | TnOAl | 18.9 | 0.70 | 0.930 |
| 11 | BEM | t-BuCl | TiCl4 | THF | TnOAl | 17.5 | 0.74 | 0.926 |
| 12 | THF | TnOAl | BEM | t-BuCl | TiCl4 | 13.6 | 0.83 | 0.928 |
| 13 | BEM | THF | t-BuCl | TnOAl | TiCl4 | 8.4 | 0.93 | 0.933 |
| 14 | t-BuCl | THF | BEM | TiCl4 | TnOAl | 9.2 | 0.81 | 0.931 |

TABLE 2

Catalyst Examples Violating the Order of Addition as Outlined in This Patent

| Catalyst Number | Order of Components | | | | | Average Yield (g) |
|---|---|---|---|---|---|---|
| 15 | t-BuCl | THF | TnOAl | BEM | TiCl4 | 1.0 |
| 16 | t-BuCl | TnOAl | BEM | THF | TiCl4 | 3.6 |
| 17 | t-BuCl | THF | BEM | TnOAl | TiCl4 | 0.4 |
| 18 | t-BuCl | TnOAl | THF | BEM | TiCl4 | 0.7 |

Technical Scale Polymerization Method

Catalysts 3; 7, 10, 19 to 24 were taken to a larger scale reactor. In this case, a 75 L stirred bed catalytic reactor similar to that described in EP 0 659 773 was used. The polymerizations were run at 88° C. with the reactor containing hydrogen, ethylene, hexene and TEAL as co-catalyst to obtain LLDPE. Nitrogen was used to maintain the total reactor pressure to approximately 2,100 kPa. The same formulation was used for all catalysts as detailed in example 1. However, for catalysts 21 and 22 trihexyl aluminum was used while in catalysts 19 and 20 TEAL was used in the same molar quantity used in example 1. Catalyst 23 was made on a somewhat different silica. The operating parameters of the reactor and the properties of the granular polymer resin are given in Table 3. As a comparative example, catalyst 24 was made with 45% less TOAl.

EXAMPLE 25

Ineos ES-70 silica (25 g) which had been dehydrated substantially as described in U.S. Pat. No. 6,140,264 was added to a 500 mL three-neck flask in a glove box. To the flask was added about 150 mL of pentane. After the pentane was added the slurry was stirred using a magnetic stir bar. To the slurry was added triisoprenyl aluminum (25 wt %, 10 g, 0.011 mole) over approximately 3 minutes. After stirring for 1.75 hours, butyl ethyl magnesium (10 wt % containing 0.33 wt % Al as TEAL, 35 g, 0.032 mole) was added over approximately 15 minutes. After stirring for 2 hours, the slurry was cooled to maintain a temperature below 20° C. while t-BuCl (6.5 g, 0.070 mole) was added as a dilute (~25 wt %) solution over about 15 minutes. After stirring for 2.5 hours the stirrer was stopped and the reaction was allowed to sit overnight. The following day, titanium tetrachloride (0.8 g, 0.0042 mole) was added as a dilute (10 wt %) solution over about 6 minutes. After 1 hour of stirring the slurry was put under vacuum and dried at 50° C. to produce approximately 43 g of tan powder having a titanium content of about 0.47%.

TABLE 3

Technical Scale Reactor Operating Conditions, Catalyst Productivity and Resin Hexane Extractables

| Catalyst Number | Order of Component Addition | | | | | Residence Time (hrs) | Productivity (gPe/gCat) Ti Balance | Density (g/cc) | MI (g/10 min) | MFR | Hexane Extractables (Plaque) (%) | Normal 1/.918 Hexane Extractables (Plaque) (%) |
|---|---|---|---|---|---|---|---|---|---|---|---|---|
| 3 | BEM | t-BuCl | TOAl | THF | TiCl4 | 1.41 | 2986 | 0.9146 | 0.74 | 26.5 | 1.14 | 1.07 |
| 7 | BEM | TOAl | t-BuCl | THF | TiCl4 | 1.75 | 3707 | 0.9217 | 1.18 | 27.2 | 1.61 | 1.89 |
| 10 | THF | BEM | t-BuCl | TiCl4 | TOAl | 1.62 | 2710 | 0.9184 | 1.06 | 26.3 | 1.28 | 1.28 |
| 19 | BEM | t-BuCl | TEAL | THF | TiCl4 | 1.68 | 3130 | 0.9194 | 0.77 | 26.3 | 0.76 | 0.96 |
| 20 | BEM | t-BuCl | TEAL | THF | TiCl4 | 1.56 | 3590 | 0.9163 | 0.88 | 26.6 | 1.1 | 1.05 |
| 21 | BEM | t-BuCl | THAl | THF | TiCl4 | 1.52 | 3612 | 0.9184 | 0.90 | 26.5 | 1.17 | 1.27 |
| 22 | BEM | t-BuCl | THAl | TiCl4 | THF | 4.44 | 490 | na | na | na | na | na |
| 23 | BEM | t-BuCl | TiCl4 | THF | TOAl | 1.38 | 1796 | 0.9160 | 0.43 | 26.2 | 0.9 | 1.23 |
| 23 | BEM | t-BuCl | TiCl4 | THF | TOAl | 1.80 | 1759 | 0.9166 | 0.48 | 25.8 | 0.97 | 1.30 |
| 24 | BEM | t-BuCl | TiCl4 | THF | TOAl | 1.61 | 3949 | 0.9187 | 0.94 | 26.5 | 1.41 | 1.53 |
| 24 | BEM | t-BuCl | TiCl4 | THF | TOAl | 1.60 | 4577 | 0.9187 | 1.17 | 27.1 | 1.62 | 1.56 |
| 24 | BEM | t-BuCl | TiCl4 | THF | TOAl | 1.79 | 3841 | 0.9215 | 0.93 | 26.7 | 1.02 | 1.34 |
| 24 | BEM | t-BuCl | TiCl4 | THF | TOAl | 1.54 | 3866 | 0.9152 | 0.57 | 27.3 | 1.15 | 1.28 |
| 24 | BEM | t-BuCl | TiCl4 | THF | TOAl | 1.79 | 3401 | 0.921 | 1.07 | 26.6 | 1.06 | 1.25 |

Bench Scale Polymerization Method for Catalyst 25

In a 2 L stirred bed catalytic reactor at 85° C. containing hydrogen (50 psi), ethylene (148 psi), hexane (600 mL) and hexene (40 mL) was added catalyst 25 (100 mg). Isoprenyl aluminum (0.9 mL of 25 wt %) was added as the co-catalyst. The polymerization was continued for 1 hour at which time the feed gases were stopped and the reactor was vented. Under these conditions 147 g of polymer having a MI of 5.2 and a density of 0.9432 was produced.

Discussion of the Results

The data in Table 1 supports the conclusion that the order of chemical reagent addition affects the catalyst productivity as well as the molecular weight and density of the resulting resins. The yield from these polymerizations runs from 7.7 to 37.9 g, the MI varies from 0.63 to 1.07 while the density varies from 0.922 to 0.933 These effects are the result of changing the order of chemical addition while maintaining the same catalyst formulation. Synthesizing catalysts which do not conform to the above stated rules produces catalysts which are essentially inactive as shown by those in Table 2. As stated in the body of the patent, altering the formulation, by increasing the Cl:Mg ratio of the catalysts in Table 2 would likely produce an active catalyst. However, it is believed that the physical properties of film grade resin will not be of commercial interest as the level of hexane extractables has been found to increase with Cl:Mg ratio.

Some of the catalysts with the highest yields were used in a larger scaled polymerization unit in which steady state conditions were obtained (Table 3). All of the catalysts produced good productivity except for catalyst 22. In this case, the synthesis order violated the rules as presented in this patent. In order to compare the hexane extractables produced from the various runs, the reported hexane extractables were normalized to a constant Ml and density based on computer models. These numbers are reported on the far right of Table 3.

Catalyst 24 is seen to have good productivity for a supported catalyst and will be used as a reference. The Al:Ti ratio is 45% lower in this catalyst than the other catalysts in Table 3. By increasing the level of TOAl, the hexane extractables have dropped by as much as 18% with an average decrease of approximately 9% but at the expense of productivity, which has decreased by approximately 55% (compare 24 to 23). However, the improvement that is seen by using the invention of this patent is that by alternating the order of the components during synthesis, the physical properties can be improved with little loss in catalysts productivity. Thus for example, for catalysts 3, 10, 19, 20 and 21 the average productivity has decreased from 3927 to 3205 g/g or about 18% while the hexane extractables have decreased from an average of 1.39 to 1.12 wt % or approximately 20%. In the best-case scenario, comparing catalysts 20 to the last three examples for catalyst 24 there is essentially no loss in productivity (3702 vs. 3590) but the hexane extractables are reduced by approximately 18% (1.29 vs 1.05). High levels of hexane extractables reduce the films properties by increasing the level of organoleptics and restricting the usefulness of the film in some applications. It would be expected that other properties such as dart impact strength and tear strength would also be improved using the current invention. In some applications, a higher level of hexane extractables is required (film wrap) and in this case catalyst 7 would be of value.

Catalyst 3 vs catalysts 19–21 show that the catalyst can be formulated with a number of different aluminum alkyls with little affect on the polymers properties such as hexane extractables.

Finally, catalyst 25 shows other co-catalysts like isoprenyl aluminum are also capable of initiating a polymerization reaction using these catalysts. Although shown is a slurry polymerization, there is a high probability that this catalyst and co-catalyst combination would be active in a gas phase mode.

What is claimed is:

1. A process for preparing an alpha-olefin polymerization catalyst composition having a productivity of greater than 1,500 g of polymer per gram of catalyst under standard gas phase operations used to manufacture an, ethylene hexene copolymer resin having a density of 0.918 g/cc and an Ml of 1 g/10 min. comprising contacting at a temperature from 0° C. to 100° C. a support which has been heat treated to remove adsorbed water and having a residual surface hydroxyl content from 0.1 to 5 mmol/g of support, which support has been subsequently treated with an aluminum compound reactive with the surface hydroxyl groups to provide from 0.5 to 2.5 wt % Al on the support, in an inert hydrocarbyl solvent or diluent with or without isolation of the treated support from the hydrocarbyl solvent or diluent with: a transition metal compound, a magnesium halide, prepared by reacting in situ an alkyl magnesium compound of the formula $(R^5)_e Mg\ X_{2-e}$ wherein each $R^5$ is independently a $C_{1-8}$ alkyl radical and e is 1 or 2 and X is a chlorine or bromine atom, with a reactive organic halide selected from the group consisting of $CCl_4$ and $C_{1-6}$ alkyl halides and mixtures thereof, a second aluminum alkyl compound and an electron donor and separating the resulting catalyst from the inert hydrocarbyl solvent or diluent provided that the order of reagent addition to the support meets the following conditions:
  (i) the transition metal compound cannot be added first;
  (ii) when the Mg compound is added first, the transition metal compound cannot be added second;
  (iii) when the second aluminum alkyl is added first, the transition metal compound cannot be added second;
  (iv) when the Mg compound and the second aluminum alkyl compound are added first and second, in any order, the transition metal compound cannot be added third;
  (v) the transitional metal compound must be added after the reactive organic halide;
  (vi) the transition metal compound must be added after the alkyl magnesium compound;
  (vii) the electron donor cannot be added last;
  (viii) the reactive organic halide cannot be added last;
  (ix) if the reactive organic halide is added first the second aluminum alkyl compound cannot be added second;
  (x) if the second aluminum alkyl compound is added first the reactive organic halide cannot be added second; and
  (xi) when the transition metal is added last, the second aluminum alkyl and Mg compounds cannot be added third or fourth, in any order.

2. The process according to claim 1, wherein the aluminum compound used to treat the support and the second aluminum compound in the catalyst are independently of the formula $R^1{}_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical.

3. The process according to claim 2, wherein in the Ziegler-Natta catalyst the transition metal compound has the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; the magnesium compound has the formula $(R^5)_e Mg X_{2-e}$ wherein each $R^5$ is independently a $C_{1-8}$ alkyl radical and e is 1 or 2 and X is a chlorine or bromine atom; the reactive halide is selected from the group consisting of $CCl_4$, $C_{3-6}$ secondary and tertiary alkyl halides, or a mixture thereof and an electron donor, said catalyst having a molar ratio of total Al to Ti from 2:1 to 15:1; a molar ratio of Al from the second aluminum component ($Al^2$): Ti from 1:1 to 8:1, a molar ratio of Mg:Ti from 1:1 to 20:1; a molar ratio of active halide from the alkyl halide to Mg from 1:1 to 6:1; a molar ratio of electron donor to Ti from 0.5:1 to 18:1 and the titanium is present in the catalyst in an amount from 0.20 to 3.0 weight % inclusive of the support.

4. The process according to claim 3, wherein the catalyst is activated with one or more co-catalyst of the formula $R^1_b Al(OR^1)_a X_{3-(a+b)}$ wherein a is either 0 or 1, b is either 2 or 3 and the sum of a+b is up to 3, $R^1$ is the same or different $C_{1-10}$ alkyl radical, X is a chlorine atom, in an amount to provide from 10 to 100 ppm of aluminum from the co-catalyst based on the polymer production rate.

5. The process according to claim 4, wherein in the catalyst the molar ratio of total Al ($Al^1+Al^2$):Ti is from 4:1 to 10:1.

6. The process according to claim 5, wherein in the catalyst the molar ratio of Mg:Ti is from 2:1 to 12:1.

7. The process according to claim 6, wherein in the catalyst the titanium component is selected from the group consisting of $TiCl_4$, $Ti(OC_4H_9)_4$, $Ti(OC_3H_7)_4$ and mixtures thereof.

8. The process according to claim 7, wherein in the catalyst the aluminum compound is selected from the group consisting of trimethyl aluminum, triethyl aluminum, diethyl aluminum ethoxide, diisobutyl aluminum ethoxide, tri iso-butyl aluminum, triisoprenyl aluminum, tri-n-hexyl aluminum, tri-n-octyl aluminum, diethyl aluminum chloride and mixtures thereof.

9. The process according to claim 8, wherein in the catalyst the magnesium compound is selected from the group consisting of dibutyl magnesium, butyl octyl magnesium and butyl ethyl magnesium, the reactive alkyl halide is present in an amount to provide a molar ratio of active halogen:Mg from 1.5:1 to 3:1.

10. The process according to claim 9, wherein in the catalyst the reactive alkyl halide is a $C_{3-6}$ secondary or tertiary alkyl chloride.

11. The process according to claim 10, wherein the electron donor is selected from the group consisting of $C_{3-18}$ linear or cyclic, aliphatic or aromatic ethers, ketones, esters, aldehydes, amides, nitriles, amines, phosphines and siloxanes.

12. The process according to claim 11, wherein the support is an inorganic support having an average particle size from about 10 to 150 microns, a surface area greater than 100 m$^2$/g, a pore volume from about 0.3 to 5.0 ml/g, a surface hydroxyl content from about 0.1 to 5 mmol/g of support.

13. The process according to claim 12, wherein the electron donor is present in an amount to provide a molar ratio of electron donor to the titanium from 2:1 to 12:1.

14. The process according to claim 13, wherein the electron donor is selected from the group consisting diethyl ether, triethyl amine, 1,4-dioxane, tetrahydrofuran, acetone, ethyl acetate, and cyclohexanone and mixtures thereof.

15. The process according to claim 14, wherein in the catalyst from 0 to 70 weight % of the aluminum compound of the formula $R^1_b Al(OR^1)_a X_{3-(a+b)}$ wherein a is either 0 or 1, b is either 2 or 3 and the sum of a+b is up to 3, $R^1$ is the same or different $C_{1-10}$ alkyl radical and X is Cl, is used to treat the support and the aluminum content on the support is included in the ratio of total Al:Ti in the catalyst.

16. The process according to claim 15, wherein the remaining aluminum compound in the catalyst is added at some point during the catalyst synthesis.

17. The process according to claim 16, wherein the titanium compound is selected from the group consisting of $Ti(OC_4H_9)_4$ and $TiCl_4$ and mixtures thereof.

18. The process according to claim 17, wherein in the catalyst the Ti is present in an amount from 0.20 to 3.0 weight % inclusive of the support.

19. The process according to claim 18, wherein the co-catalyst is triethyl aluminum.

20. A process according to claim 1, wherein the catalyst is prepolymerized to provide from 5 to 20 weight % of catalyst in the prepolymer.

21. A gas phase process for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, conducted at a temperature from 50° C. to 1250° C. in the presence of a catalyst according to claim 1.

22. The process according to claim 21, wherein the co-monomer is selected from the group consisting of butene, 4-methyl pentene, hexene, and mixtures thereof.

23. The process according to claim 21, wherein the co-catalyst is triethyl aluminum and is used in an amount to provide from 10 to 50 ppm of aluminum based on polymer production rate.

24. A process for controlling the catalyst productivity above 1,500 g of polymer per gram of catalyst under standard gas phase operations to manufacture an ethylene hexene copolymer having a density of 0.918 g/cc and a Ml of 1 g/10 mm. comprising contacting at a temperature from 0° C. to 100° C. a support which has been heat treated to remove adsorbed water and having a residual surface hydroxyl content from 0.1 to 5 mmol/g of support, which support has been subsequently treated with an aluminum compound of the formula $R^1_b Al(OR^1)_a X_{3-(a+b)}$ wherein a is either 0 or 1, b is either 2 or 3 and the sum of a+b is up to 3, $R^1$ is the same or different $C^{1-10}$ alkyl radical, in an inert hydrocarbyl solvent or diluent with or without isolation of the treated support from the hydrocarbyl solvent or diluent to provide 0.5 to 2.5 wt % Al on the support: a transition metal compound of the formula $Ti(OR^2)_c X_d$ wherein $R^2$ is selected from the group consisting of a $C_{1-4}$ alkyl radical and a $C_{6-10}$ aromatic radical, X is selected from the group consisting of a chlorine atom and a bromine atom, is 0 or an integer up to 4 and d is 0 or an integer up to 4 and the sum of c+d is the valence of the Ti atom; a magnesium compound, of formula $(R^5)_e Mg X_{2-e}$ wherein each $R^5$ is independently a $C_{1-8}$ alkyl radical and e is 1 or 2 and X is a chlorine or bromine atom; a reactive organic halide selected from the group consisting of $CCl_4$, $C_{3-6}$ secondary and tertiary alkyl halides and mixtures thereof; a second aluminum alkyl compound independently having the formula $R^1_b Al(OR^1)_a X_{3-(a+b)}$ wherein a is either 0 or 1, b is either 2 or 3 and the sum of a+b is up to 3, $R^1$ is the same or different $C_{1-10}$ alkyl radical and an electron donor to provide a molar ratio of total Al to Ti from 2:1 to 15:1; a molar ratio of Al from the second aluminum component ($Al^2$): Ti from 1:1 to 8:1; a molar ratio of Mg:Ti from 1:1 to 20:1; a molar ratio of active halide from the alkyl halide to Mg from 1:1 to 6:1; a molar ratio of electron donor to Ti from 0.5:1 to 18:1 and the titanium is present in the catalyst in an amount from 0.20 to 3.0 weight % inclusive of the support and separating the resulting catalyst from the inert hydrocarbyl solvent or diluent provided that the order of reagent addition to the support meets the following conditions:

(i) the transition metal compound cannot be added first;
(ii) when the Mg compound is added first, the transition metal compound cannot be added second;
(iii) when the second aluminum alkyl is added first, the transition metal compound cannot be added second;
(iv) when the Mg compound and the second aluminum alkyl compound are added first and second, in any order, the transition metal compound cannot be added third;
(v) the transitional metal compound must be added after the reactive organic halide;
(vi) the transition metal compound must be added after the magnesium compound;
(vii) the electron donor, cannot be added last;
(viii) the reactive organic halide cannot be added last;
(ix) if the reactive organic halide is added first the second aluminum alkyl compound cannot be added second;
(x) if the second aluminum alkyl compound is added first the reactive organic chloride cannot be added second; and
(xi) when the transition metal is added last, the second aluminum alkyl and Mg compounds cannot be added third or fourth, in any order.

25. A slurry phase process for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, in an inert diluent conducted at a temperature from 50° C. to 125° C. in the presence of a catalyst according to claim 1.

* * * * *